US006981716B2

(12) United States Patent
 Takeda

(10) Patent No.: US 6,981,716 B2
(45) Date of Patent: Jan. 3, 2006

(54) TOWING DEVICE

(75) Inventor: Mitsumasa Takeda, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 0 days.

(21) Appl. No.: 10/318,840

(22) Filed: Dec. 13, 2002

(65) Prior Publication Data

US 2003/0116940 A1    Jun. 26, 2003

(30) Foreign Application Priority Data

Dec. 25, 2001    (JP)    ............................ 2001-391496

(51) Int. Cl.
    *B60D 1/02*    (2006.01)
(52) U.S. Cl. ..................... 280/515; 280/504
(58) Field of Classification Search ............... 280/515, 280/504, 506, 507, 512, 514, 477; 74/469, 74/500.5, 501.6, 502.6; 403/157; 292/25, 292/28, 35, 38, 41, 53, 84, 125, 225
    See application file for complete search history.

(56) References Cited

U.S. PATENT DOCUMENTS

| | | | | |
|---|---|---|---|---|
| 1,837,940 A | * | 12/1931 | Ade ............................ 280/508 |
| 2,442,439 A | * | 6/1948 | Schultz ....................... 280/508 |
| 2,671,673 A | * | 3/1954 | Benson ........................ 280/477 |
| 3,313,558 A | * | 4/1967 | Wolfgang .................... 280/515 |
| 3,326,575 A | * | 6/1967 | Shepley ....................... 280/515 |
| 3,744,819 A | * | 7/1973 | Cook et al. ................. 280/477 |
| 4,311,244 A | * | 1/1982 | Hindin et al. ................ 213/86 |
| 5,083,808 A | * | 1/1992 | Torii ........................... 280/507 |

FOREIGN PATENT DOCUMENTS

| | | |
|---|---|---|
| JP | 04-129811 | 4/1992 |
| JP | 7-8008 | 2/1995 |

* cited by examiner

*Primary Examiner*—Daniel G. DePumpo
(74) *Attorney, Agent, or Firm*—Knoble Yoshida & Dunleavy LLC

(57) ABSTRACT

A towing device for selectively locking a towing load has a support member that pivotably supports a link member at a first pivotal point near the first proximal end. A stopper is located on the support member for regulating a pivotal movement of the link member. A joint member is pivotably coupled to the link member near the first proximal end at a second pivotal point and has a tendency to pivot about the second pivotal point toward the first pivotal point to contact the stopper as the first proximal end pivots toward the stopper about the first pivotal point. A coupling member is connected to the second distal end of the joint member. An interference avoiding unit is located near the joint member for guiding the joint member to maintain a certain distance from the stopper as the link member pivots about the first pivotal point.

10 Claims, 10 Drawing Sheets

TOWING DEVICE

BACKGROUND OF THE INVENTION

The present invention relates to a towing device for selectively locking a towing load.

A towing tractor generally includes one of towing devices. Referring to FIGS. 8 through 10, a towing device of a towing tractor generally has a support member 3, a shaft C, a first link member 5, a second link member 15, an operational member 6, a drawbar pin 16 and a drawbar bracket 17. The support member 3 is erected near the rear side of a vehicle body 2 and pivotably supports the shaft C. The proximal end of the first link member 5 and the proximal end of the operational member 6 are fixedly connected to the shaft C so that the shaft C, the first link member 5 and the operational member 6 integrally pivot. The second link member 15 is pivotably coupled to the distal end of the first link member 5 at its one end and is also pivotably coupled to a head 16a of the drawbar pin 16 at the other end. The drawbar bracket 17 is fixedly connected to the rear end and lower side of the vehicle body 2. The drawbar pin 16 is fitted in the drawbar bracket 17 to be raised or lowered. The drawbar pin 16 is coupled with a drawbar of a carriage so that the carriage is towed. The first and second link members 5 and 15 constitute a link mechanism.

A stopper or a rotation regulating member includes a stopper bracket 10 and a stopper bolt 11. The stopper bracket 10 is fixedly connected to the support member 3. The stopper bolt 11 is fitted into a through hole of the stopper bracket 10 and is adjustable in its level to regulate the maximum upward rotational distance of the first link member 5. The stopper bolt 11 is supported by the stopper bracket 10 and is located under the operational member 6 so as to correspond with the rotational range of the operational member 6. The stopper bolt 11 contacts the operational member 6 as the drawbar pin 16 is raised upward through the link mechanism.

A clevis 7 is coupled to the distal end of the operational member 6 at its one end and is connected to a cable 8 at the other end. The cable 8 travels near a rear axle of the vehicle body 2 and is ultimately coupled to a link lever 13 of a drawbar operation lever 14 that is located near an operator seat through a clevis 12. When the drawbar operation lever 14 is manipulated to raise the drawbar pin 16, the cable 8 is tensioned to pull the clevis 7 so that the clevis 7 pivots about a pivotal point between the clevis 7 and the operational member 6. As a result, the clevis 7 does not contact the stopper bracket 10.

When an operator holds a grip portion 5a of the first link member 5 and manually lifts up the first link member 5 to raise the drawbar pin 16, since the operation lever 14 is not manipulated, the cable 8 is not tensioned. Only the operational member 6 pivots about the shaft C in the counter-clockwise direction in the drawings. Then, the operational member 6 pushes the cable 8 downward to bend the cable 8 so that the clevis 7 tends to pivot toward the stopper bracket 10 and the stopper bolt 11. In this case, since the length of the clevis 7 is shorter than the distance between the operational member 6 and the stopper bolt 10, the clevis 7 gets entangled with the stopper bolt 11 or the stopper bracket 10 so that a contact surface 6a of the operational member 6 does not move to contact the upper end surface of the stopper bolt 11. As a result, the drawbar pin 16 cannot completely be raised, and the manually raising operation is interrupted. The clevis 7 needs to be moved in the operator's hand to remove interference between the clevis 7 and the stopper bracket 10 and between the clevis 7 and the stopper bolt 11. Thus, the operation is complicated. Therefore, it is desired that a towing device that does not interrupt the drawbar operation by overcoming the interference between the clevis 7 and the stopper bracket 10 and between the clevis 7 and the stopper bolt 11.

SUMMARY OF THE INVENTION

In order to solve the above and other problems, according to a first aspect of the current invention, a towing device for selectively locking a towing load, including a support member, a link member having a first proximal end and a first distal end, the link member being pivotably coupled to the support member at a first pivotal point near the first proximal end, a stopper located on the support member for regulating a pivotal movement of the link member by contacting the link member between the first pivotal and the first proximal end, a joint member having a second proximal end and a second distal end, the joint member pivotably jointed to the link member at a second pivotal point near the first proximal end, the joint member having a tendency to pivot about the second pivotal point toward the support member to contact the stopper as the first proximal end of the link member pivots toward the stopper about the first pivotal point, a coupling member connected to the second distal end of the joint member for controlling the pivotal movement of the link member, and an interference avoiding unit located near the joint member for guiding the joint member to maintain a certain distance from the stopper as the link member pivots about the first pivotal point, wherein the interference avoiding unit is an interference avoiding member that is located between the joint member and the stopper.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A first preferred embodiment of the present invention will now be described in reference to FIGS. 1 and 2. Components irrespective of a drawbar operation mechanism are substantially identical to those of the prior art. Therefore, the description of the above components will briefly be described.

Figure 1:
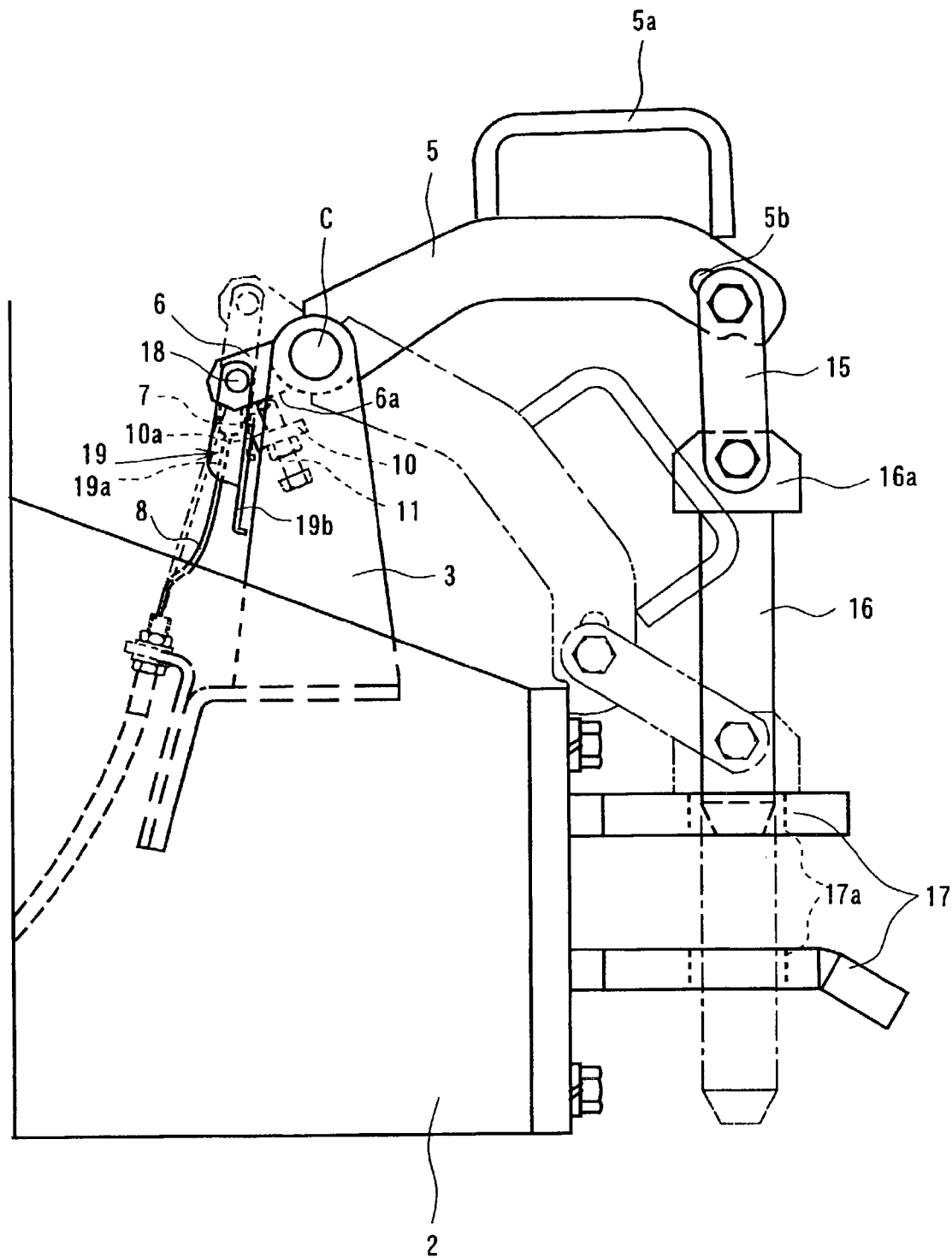
FIG. 1 is a side view of a towing device according to a first preferred embodiment of the present invention.

Now referring to FIG. 1, a diagram illustrates a side view of a towing device according to the first preferred embodiment of the present invention. A support member 3 is erected on the rear side of a vehicle body 2. A shaft C is pivotably supported near the upper end of the support member 3. The proximal end of a first link member 5 is fixedly connected to the shaft C. The proximal end of an operational member 6 is also fixedly connected to the shaft and the proximal end of the first link member 5. The distal end of the operational member 6 extends from the shaft C toward the front side of the vehicle body 2 or toward an operator seat. The shaft C, the first link member 5 and the operational member 6 integrally pivot.

A link mechanism includes the first link member 5 and a second link member 15 through which a drawbar pin or a locking portion 16 is raised or lowered. The first link member 5 includes a grip portion 5a, and the distal end of the first link member 5 is coupled to the second link member 15 through an oblong hole 5b. The second link member 15 is coupled to a head 16a of the drawbar pin 16. As the first link member 5 pivots about the shaft C, the drawbar pin 16 moves vertically up and down along a drawbar pin hole 17a of a drawbar bracket 17. The drawbar pin 16 couples a drawbar of a carriage or a towing load therewith when it is lowered so as to tow the carriage.

Figure 8:
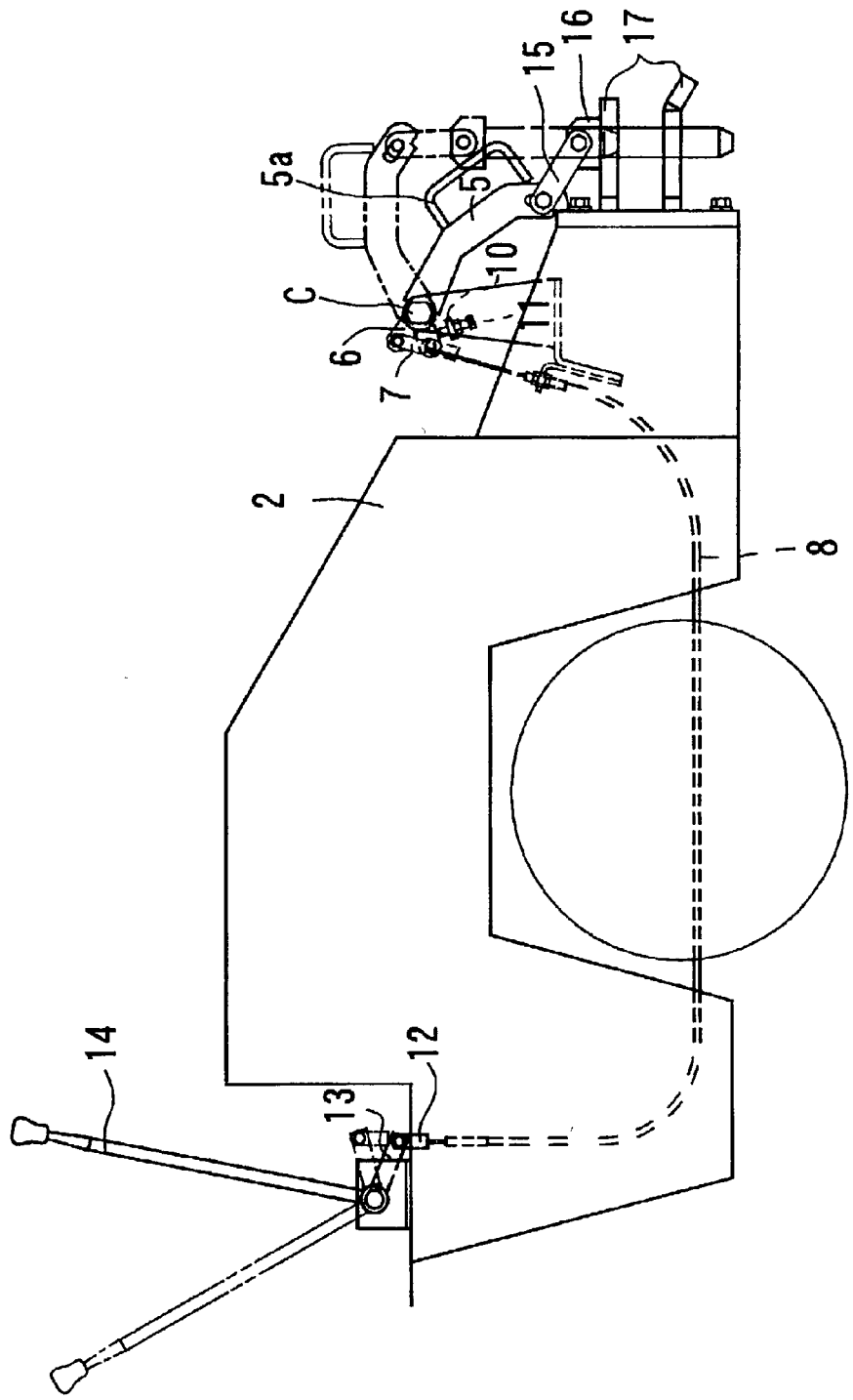
FIG. 8 is a side view of a towing tractor according to a prior art.
Figure 9:
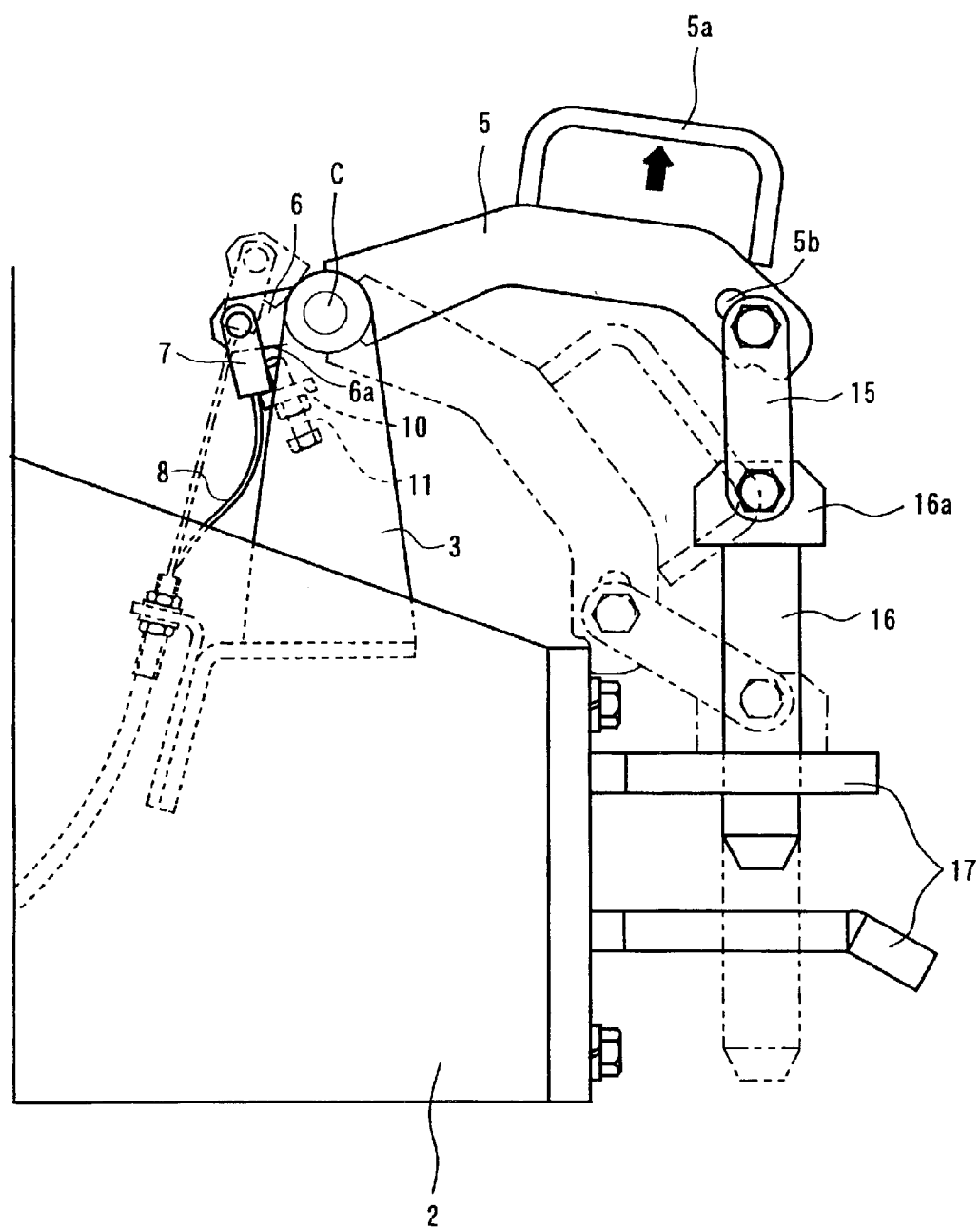
FIG. 9 is a side view of a towing device according to the prior art.
Figure 10:
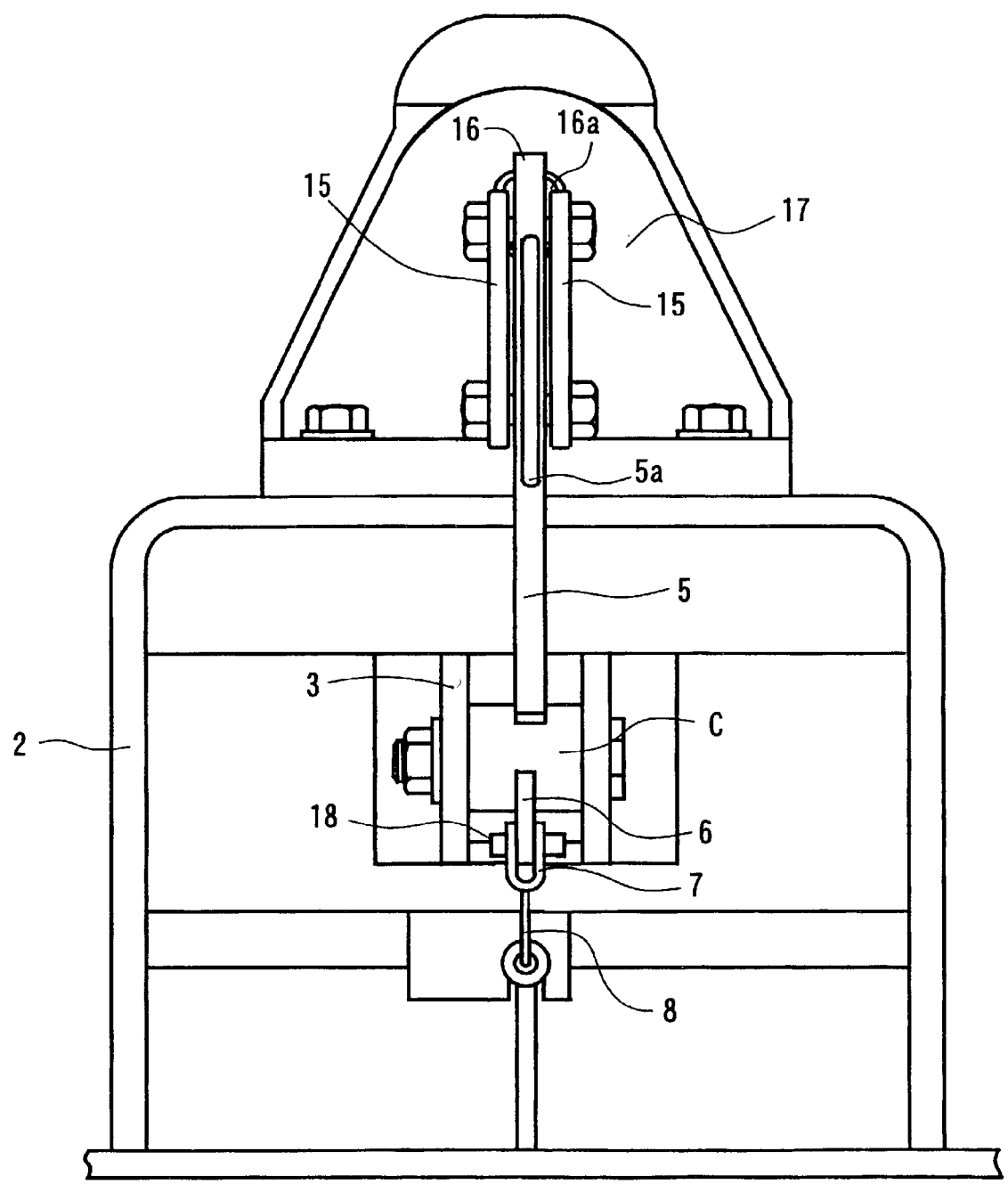
FIG. 10 is a plan view of a towing device according to the prior art.

A stopper or a rotation regulating member includes a stopper bracket 10 and a stopper bolt 11. The stopper bracket 10 is fixedly connected to the support member 3. The stopper bolt 11 is fitted into a through hole of the bracket 10 and is adjustable in its level to regulate the maximum upward rotational distance of the first link member 5. The stopper bolt 11 is supported by the stopper bracket 10 and is located under the operational member 6 so as to correspond with the rotational range of the operational member 6. The stopper bolt 11 contacts the operational member 6 as the drawbar pin 16 is raised upward through the link mechanism. A clevis or a joint member 7 is pivotably coupled to the operational member 6 through a coupling pin 18. A cable or a coupling member 8 is connected to the clevis 7. The other end of the cable 8 travels near a rear axle of the vehicle body 2 and is coupled to an operation lever 14 that is located near the operator seat through a clevis 12, as shown in FIG. 8. A guide member or an interference avoiding member 19 includes a plate bracket 19a and a plate portion 19b. The proximal end of the plate bracket 19a is rotatably coupled to the coupling pin 18. The plate portion 19b is fixedly connected to the plate bracket 19a and is L-shaped in side view.

Figure 2:
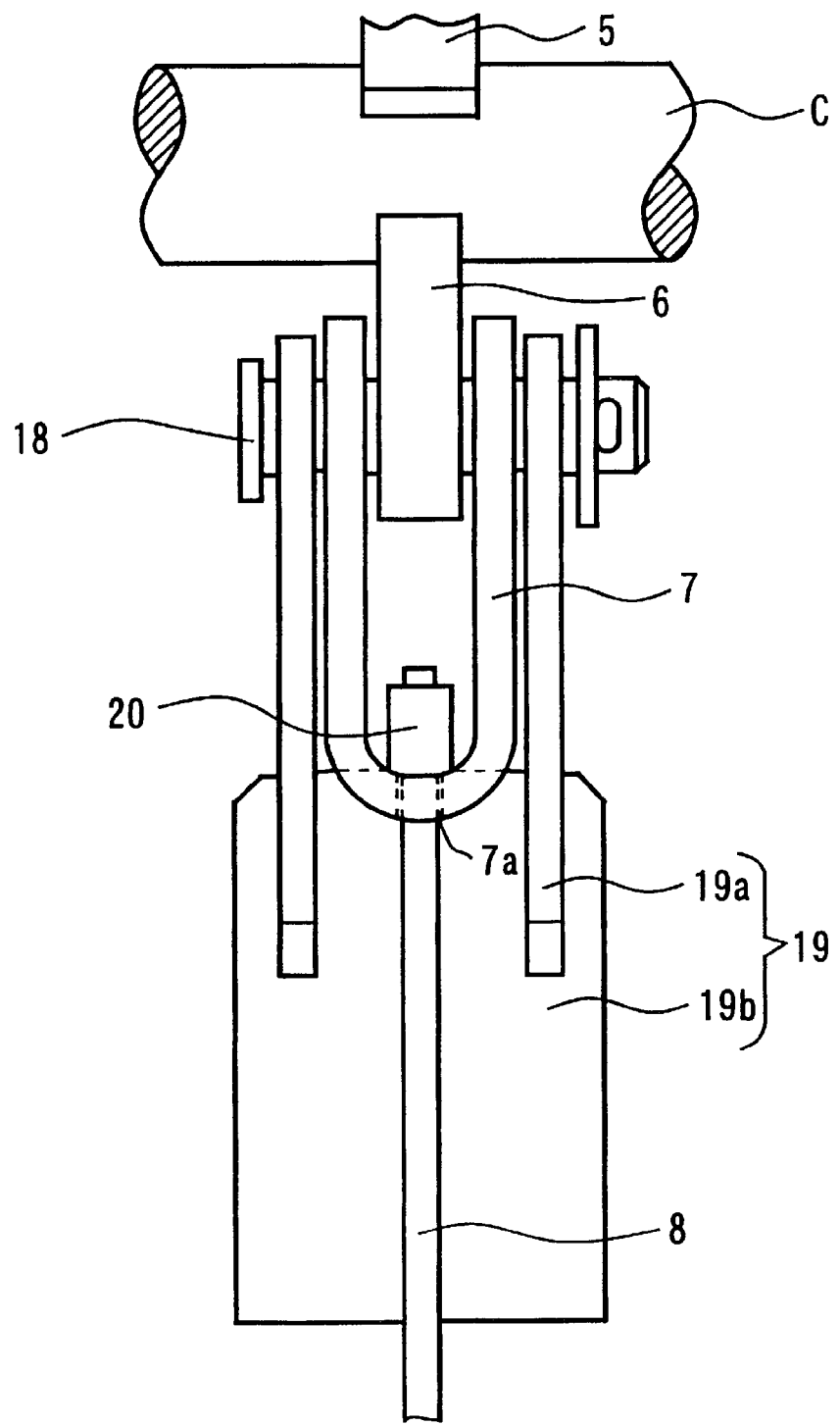
FIG. 2 is an enlarged end view of an interference avoiding unit according to the first preferred embodiment of the present invention.

Now referring to FIG. 2, a diagram illustrates an enlarged end view of a towing device according to the first preferred embodiment of the present invention. The proximal end of the clevis 7 is pivotably coupled to the distal end of the operational member 6 through the coupling pin 18. The distal end of the clevis 7 includes a through hole 7a for inserting a cable or a coupling member 8. One end of the cable 8 is inserted through the through hole 7a and is connected to the clevis 7 by a fixing holder 20.

Referring back to FIG. 1, when the first link member 5 is raised to rotate around the shaft C by holding the grip portion 5a that is secured to the first link member 5, the cable 8 tends to pliantly bend toward the support member 3 so that the clevis 7 together with the cable 8 also tends to pivot toward the support member 3, that is, a counterclockwise direction in the drawing. Meanwhile, the plate portion 19b of the guide member 19 is in contact with an edge 10a of the stopper bracket 10, and the plate portion 19b contacts the clevis 7 to prevent the clevis 7 from further pivoting toward the stopper bracket 10. Since the guide member 19 itself is rotatably coupled to the operational member 6 through the shaft C, the guide member 19 slides on the stopper bracket 10 as the first link member 5 pivots. In the meantime, the clevis 7 is in contact with the guide member 19 and is not caught by the stopper bolt 11 and the stopper bracket 10. Similarly, the cable 8 that is connected to the clevis 7 is not caught by the stopper bolt 11 and the stopper bracket 10.

According to the first preferred embodiment, the following advantageous effects are obtained.

(1) Even if the first link member 5 is directly pivoted by hand to raise the drawbar pin 16 so that the cable 8 pliantly bends, the lower end of the clevis 7 and the cable 8 are not caught by the stopper. As a result, the first link member 5 smoothly pivots without any interference.

(2) The guide member 19 and the clevis 7 slides on the stopper bracket 10. Due to the slide, the guide member 19 not only prevents the stopper from interfering with the clevis 7 and the cable 8 but also guides the clevis 7 and the cable 8.

(3) Since the lower end of the guide member 19 forms a rounded surface in such a manner that the lower end of the guide member 19 is bent away from the cable 8, even if the cable contacts the lower end of the guide member 19, the cable 8 is not damaged.

A second preferred embodiment of the present invention will now be described in reference to FIGS. 3 and 4. In the first preferred embodiment, the plate portion 19b of the guide member 19 is located between the clevis 7 and the stopper bracket 10. Instead, in the second preferred embodiment, the shape of the clevis 7 is changed to obtain the same advantageous effects. The same reference numerals in the second preferred embodiment denote the corresponding components in the first preferred embodiment, and description of the substantially identical components is omitted.

Figure 3:
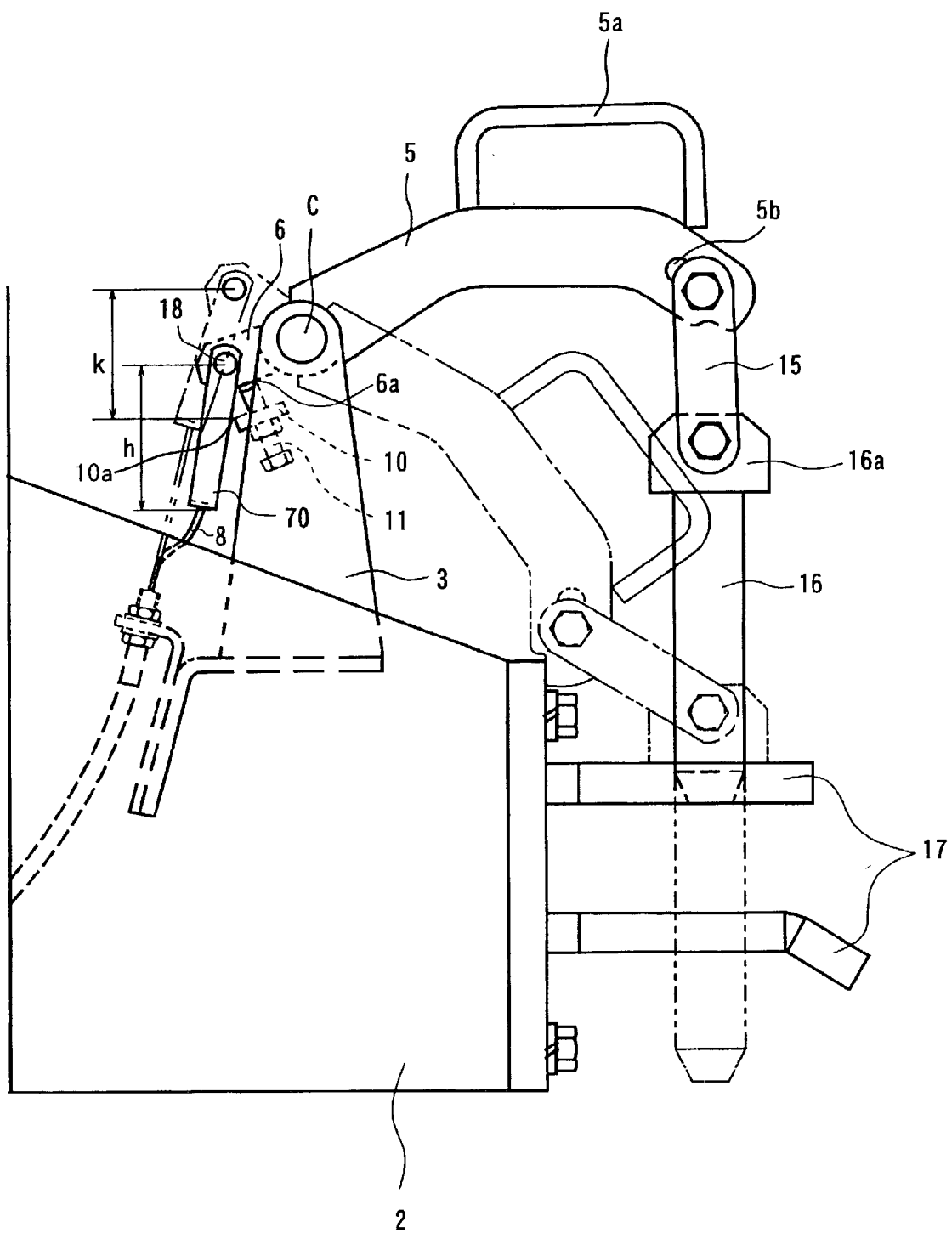
FIG. 3 is a side view of a towing device according to a second preferred embodiment of the present invention.

Now referring to FIG. 3, a diagram illustrates a side view of a towing device according to the second preferred embodiment of the present invention. The guide member 19 in the first preferred embodiment is not provided in the second preferred embodiment. Instead, the clevis 70 functions as an interference avoiding member by elongating the clevis 7. Where h is a distance between a pivotal axis of the coupling pin 18 and the support member side edge of the lower end of the clevis 70, and where k is the longest distance between the pivotal axis of the coupling pin 18 and the edge 10a of the stopper bracket 10, the distance h is longer than the distance k.

Figure 4:
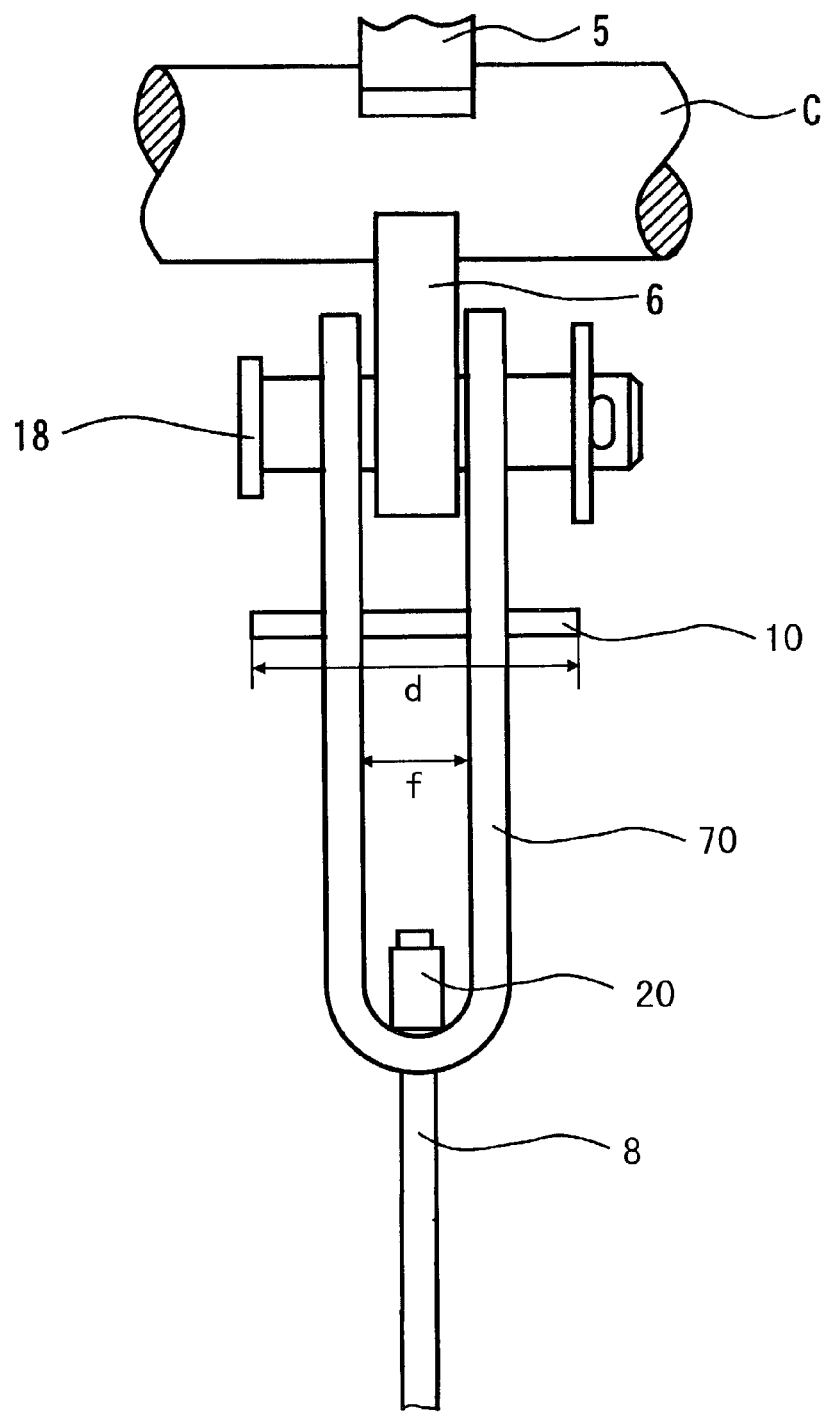
FIG. 4 is an enlarged end view of an interference avoiding unit according to the second preferred embodiment of the present invention.

Now referring to FIG. 4, a diagram illustrates an enlarged end view of a towing device according to the second preferred embodiment of the present invention. Where d is a width of the stopper bracket 10, and where f is a distance between longitudinally extending portions of the clevis 70, the width d is longer than the distance f.

Referring back to FIG. 3, when the first link member 5 is raised by holding the grip portion 5a, the cable 8 pliantly bends so that the clevis 70 tends to pivot about the axis of the coupling member 18 toward the support member 3, that is, a clockwise direction in the drawing. However, since the longitudinally extending portion of the clevis 70 contacts the stopper bracket 10, the longitudinally extending portion prevents the clevis 70 from further pivoting so that the clevis 70 slides on the stopper bracket 10.

Incidentally, the clevis 70 is illustrated to avoid interference with the stopper bracket 10 in the drawing for easier understanding. However, interference with the clevis 70 is also avoided by changing the shape of the stopper bolt 11.

According to the second preferred embodiment, the following advantageous effects are obtained.

(1) The lower end of the clevis 70 avoids interference with the stopper without increasing the number of components.
(2) Since the clevis 70 extends in a longitudinal direction of the cable 8, the cable 8 is remotely located from the stopper so that the cable 8 avoids interference with them.

A third preferred embodiment of the present invention will now be described in reference to FIGS. 5 and 6. In the above preferred embodiments, the guide member 19 is located between the clevis 7 and the stopper bracket 10 in the first preferred embodiment, and the shape of the clevis 7 itself is changed in the second preferred embodiment. In the third preferred embodiment, a compression spring or an urging member 25 urges the clevis 7 away from the stopper to obtain the same advantageous effects. The same reference numerals in the second preferred embodiment denote the corresponding components in the first preferred embodiment, and description of the substantially identical components is omitted.

Figure 5:
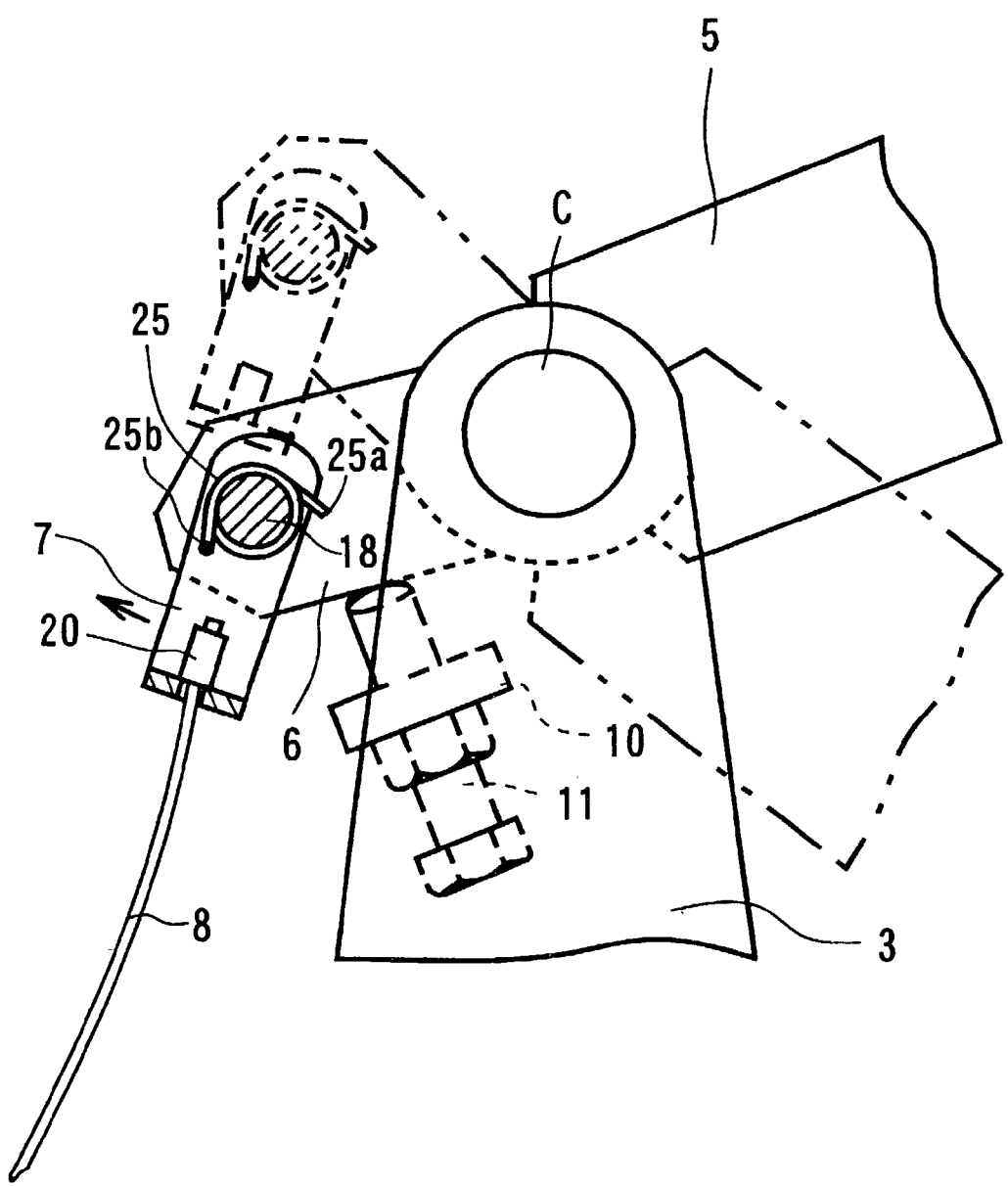
FIG. 5 is an enlarged side view of an interference avoiding unit according to a third preferred embodiment of the present invention.

Now referring to FIG. 5, a diagram illustrates an enlarged side view of an interference avoiding unit according to the third preferred embodiment of the present invention. The compression spring or an interference avoiding member 25 winds around the coupling pin 18 that couples the clevis 7 and the operational member 6. The compression spring 25 urges the clevis 7 away from the stopper, that is, a direction indicated by an arrow in the drawing.

Figure 6:
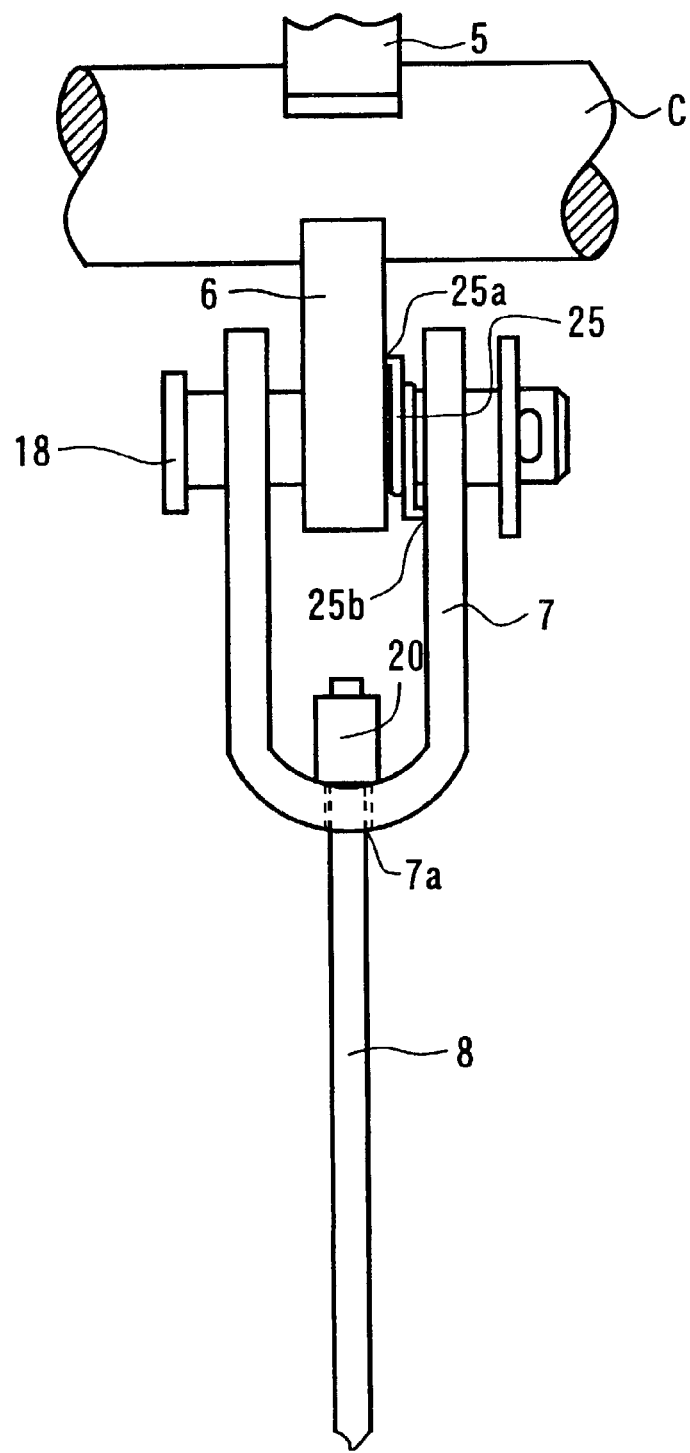
FIG. 6 is an enlarged end view of an interference avoiding unit according to the third preferred embodiment of the present invention.

Now referring to FIG. 6, a diagram illustrates an enlarged end view of the interference avoiding unit according to the third preferred embodiment of the present invention. The compression spring 25 is located between the clevis 7 and the operational member 6. One end 25a of the compression spring 25 is secured to the operational member 6, and the other end 25b is secured to the clevis 7.

Referring back to FIG. 5, when the first link member 5 is raised by holding the grip portion 5a to loosen the tension of the cable 8, the clevis 7 pivots about the axis of the coupling pin 18 away from the stopper due to urging force of the compression spring 25.

According to the third preferred embodiment, the following advantageous effect is obtained.

(1) Only one simple additional component, which is the urging member such as the compression spring 25, is merely provided to avoid interference between the lower end of the clevis 7 and the stopper.

The present invention is not limited to the above preferred embodiments but may be modified into the following alternative embodiments.

In alternative embodiments to the above preferred embodiments, a chain is employed as a coupling member instead of the cable 8.

In alternative embodiments to the above first and third embodiments, an interference avoiding member, such as the guide member 19 and the compression spring 25, is located on the stopper bolt 11 or the vehicle body 2.

Figure 7:
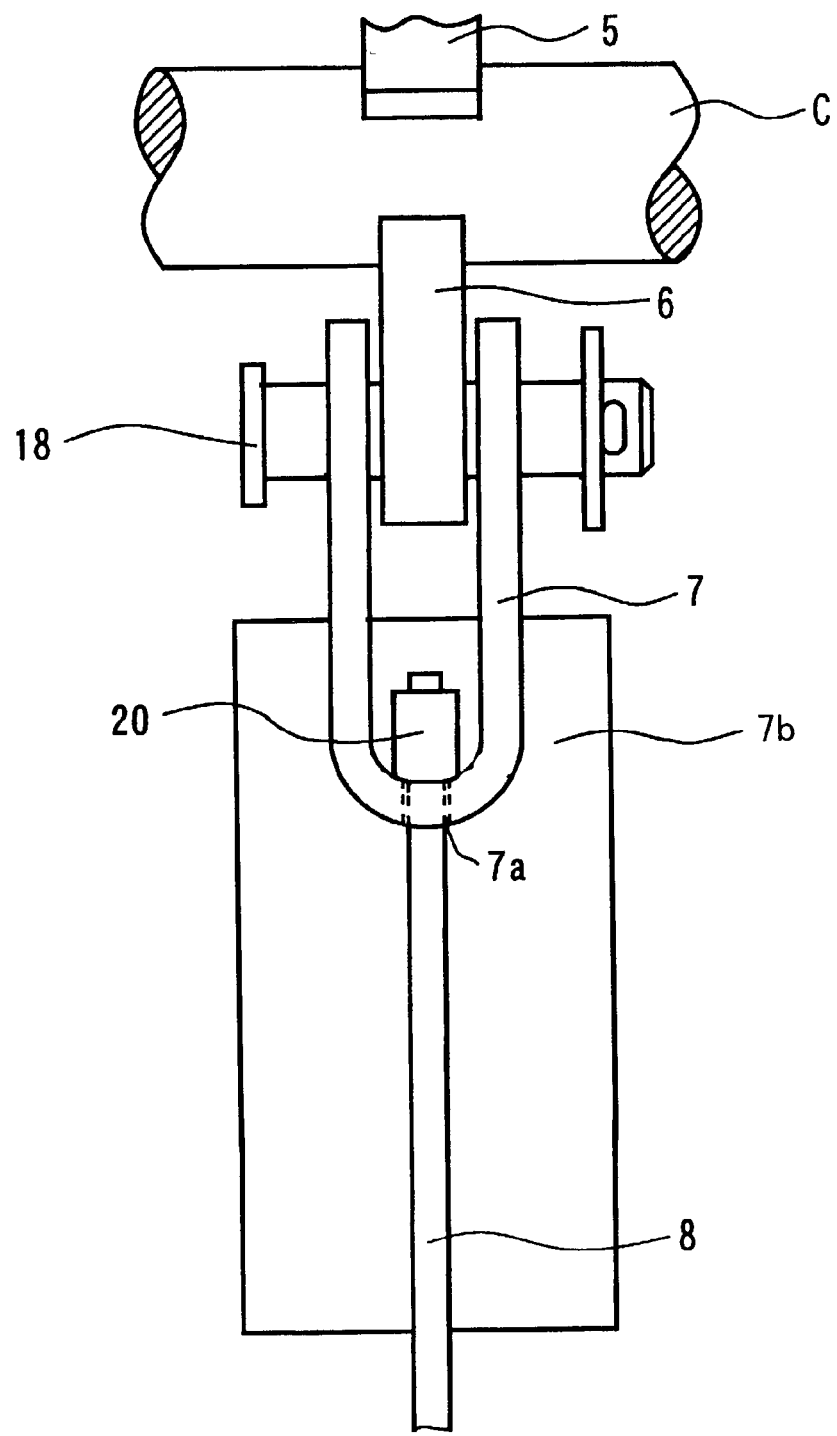
FIG. 7 is an enlarged end view of an interference avoiding unit according to an alternative embodiment of the present invention.

In alternative embodiments to the above first preferred embodiment, an interference avoiding member is integrated with a joint member. For example, referring to FIG. 7, a plate 7b is secured to the clevis 7.

In alternative embodiments to the above second preferred embodiment, a portion of the clevis 70 facing the stopper bracket 10 includes a sufficient length for avoiding interference.

In alternative embodiments to the above third preferred embodiment, a pair of the compression springs 25 is located on both sides of the operational member 6, and each of the compression springs 25 couples the operational member 6 and the clevis 7.

In alternative embodiments to the above third preferred embodiment, an urging member is not limited to the compression spring 25. In addition, a position of the urging member is not limited. As far as the urging member urges the clevis 7 away from the stopper, any positions are applicable.

Therefore, the present examples and embodiments are to be considered as illustrative and not restrictive, and the invention is not to be limited to the details given herein but may be modified within the scope of the appended claims.

What is claimed is:

1. A towing device for selectively locking a towing load, comprising:
    a support member;
    a link member having a first proximal end and a first distal end, the link member being pivotably coupled to the support member at a first pivotal point near the first proximal end;
    a stopper located on the support member for regulating a pivotal movement of the link member by contacting the link member between the first pivotal point and the first proximal end;
    a joint member having a second proximal end and a second distal end, the joint member pivotably jointed to the link member at a second pivotal point near the first proximal end, the joint member having a tendency to pivot about the second pivotal point toward the support member to contact the stopper as the first proximal end of the link member pivots toward the stopper about the first pivotal point;
    a coupling member connected to the second distal end of the joint member for controlling the pivotal movement of the link member; and
    an interference avoiding unit located near the joint member for guiding the joint member to maintain a certain distance from the stopper as the link member pivots about the first pivotal point, wherein the interference avoiding unit is an interference avoiding member that is located between the joint member and the stopper.

2. The towing device according to claim 1, wherein the interference avoiding member is pivotably coupled to the second pivotal point, the interference avoiding member being in slide contact with the stopper.

3. The towing device according to claim 1, wherein the interference avoiding member is partially connected to the joint member, the interference avoiding member being in slide contact with the stopper.

4. The towing device according to claim 1, wherein the interference avoiding unit is integrated with the joint member.

5. The towing device according to claim 4, wherein the joint member is elongated substantially along a longitudinal direction of the coupling member.

6. The towing device according to claim 1, wherein the coupling member is a cable and/or a chain.

7. The towing device according to claim 1, further comprising:
   an operation lever remotely located from the link member, the operation lever being connected to the coupling member for operating the link member.

8. The towing device according to claim 1, further comprising:
   a locking portion pivotably coupled near the first distal end of the link member for engaging the towing load.

9. The towing device according to claim 8, wherein the locking portion includes a drawbar pin.

10. The towing device according to claim 1, wherein the joint member has a tendency to pivot about the second pivotal point toward the support member to contact the stopper when the link member is raised.

* * * * *